United States Patent [19]

Matsuo

[11] Patent Number: 4,746,974
[45] Date of Patent: May 24, 1988

[54] ENDOSCOPIC APPARATUS

[75] Inventor: Satoshi Matsuo, Tochigi, Japan

[73] Assignee: Kabushiki Kaisha Toshiba, Kawasaki, Japan

[21] Appl. No.: 11,113

[22] Filed: Feb. 5, 1987

[30] Foreign Application Priority Data

Feb. 6, 1986 [JP] Japan .................................. 61-24646

[51] Int. Cl.⁴ ........................... H04N 9/73; A61B 1/04
[52] U.S. Cl. .......................................... 358/98; 358/1; 358/29
[58] Field of Search ................................ 358/98, 1, 29

[56] References Cited
U.S. PATENT DOCUMENTS 4,621,284 11/1986 Nishioka ................................... 358/1
4,660,075 4/1987 Hashimoto ............................ 358/29
4,700,218 10/1987 Thomsen ............................... 358/29
4,706,108 11/1987 Kumagai ............................... 358/29

Primary Examiner—Howard W. Britton
Attorney, Agent, or Firm—Foley & Lardner, Schwartz, Jeffery, Schwaab, Mack, Blumenthal & Evans

[57] ABSTRACT

A endoscopic apparatus according to the present invention having a solid state image pickup elements to obtain an image data, which comprises: rewritable regulation memory circuits for memorizing the image data, the color balance of which is regulated; a counter which counts the image data from the memory circuits and is shifted UP/DOWN to regulate the counted image data; and a feedback circuit for supplying the regulated image data again to the memory circuits from the counter.

10 Claims, 4 Drawing Sheets

PRIOR ART

ENDOSCOPIC APPARATUS

BACKGROUND OF THE INVENTION

1. Field of the Invention

The present invention relates to an endoscopic apparatus which is equpped with solid state image pickup elements on the tip of its scope.

2. Description of the Prior Art

In an endoscopic apparatus of the above kind, it is general to adjust the white balance by means of an electronic circuit, in view of the nonuniformity that may exist among individual apparatus in such items as the light source, light guiding fiber, lens, or their combinations, color filter that is mounted in front of the solid state image pickup element, spectroscopic sensitivity characteristic of the solid state image pickup element, or the like.

Further, although an apparatus of field sequential system does not employ a color filter, it instead makes use of three color filters that are placed on the light source side, and the nonuniformity of these filters needs be considered, so that it is also general to adjust the white balance by the use of an electronic circuit.

As the means of adjusting the white balance, it is general for television cameras to use two kinds of means. First one is means of manual type whose block diagram is shown in FIG. 1. Second means is of automatic type whose block diagram is shown in FIG. 2. The white balance is carried out in general by fixing green out of the three primary colors and regulating the amplitude of red (referred to as R hereinafter) and blue (referred to as B hereinafter) signals. Since, however, both of the means shown in FIG. 1 and FIG. 2 employ the same regulation method for R and B, only one system of block diagram is illustrated in these figures.

In FIG. 1, a gain regulation circuit 22 determines the amplitude of a color signal by regulating the gain of the circuit through manual variation of the volume. The color signal whose amplitude is regulated inthe above manner is input to a color difference circuit 23 in the next stage where the difference between the luminance signal (referred to as Y signal hereinafter) is taken as a color difference signal which is input to an encoder (Not shown. It is a circuit which generates a TV signal from the luminous the color difference signal and Y signal.). When the output amplitude of the gain regulation circuit 22 becomes small, the R signal, for example, tends to have a bluish-greenish hue and the B signal tends to have a yellowish hue. On the contrary, when the output amplitude of the gain regulation circuit 22 becomes large, the R signal tends to have a reddish hue and the B signal tends to have a bluish hue.

The means shown in FIG. 2 is of a system which automatically carries out the gain regulation. In the figure, there are provided an electronic attenuator 24 and a color difference circuit 25 that correspond to the gain regulation circuit 22 and the color difference circuit 23 in FIG. 1. The output of the color difference circuit 25 is input to a level clamp 26 whre DC regeneration is carried out for the purpose of comparison with a reference voltage in the next stage, and a black level (state of no signal) is set. A comparator 27 compares the output of the level clamp 26 and the reference voltage, and brings UP/DOWN a counter 28 in the next stage in accordance with the size of the signal. A D/A conversion circuit 29 converts the output from the counter 28 to an analog signal. The analog signal thus converted is input to the electronic attenuator 24 to vary its gain. As a result, the output of the color difference signal 25, too, is varied in response to the output of the D/A converter 29. This series of operation is set to work as the so-called negative feedback so that the color difference signals (R-Y and B-Y) are kept at constant values irrespective of the amplitude of the signal input.

In such white balance regulation means itself there is no special problem. However, there does exist a problem in the endoscope in that colors appear localized depending upon the area of the object. Thus, for instance, stomach presents a reddish hue overall, missing various other colors that are included in the scenery and indoor images. For that reason, when a white body, for instance, is seen in the interior of the stomach there is a problem that it appears somewhat reddish because of the light reflected from the wall of the stomach. In order to resolve such a problem, it is conceivable to perform a white balancing by placing a white body on the tip of the endoscope. However, this method is neither practical nor useful for accomplishing the white balance of the solid state pickup elements which has an inherent characteristic.

In addition, in diagnosis, a maximum information amount may not necessarily be guaranteed to be obtainable in a state in which the white balance is being kept. In fact, depending upon the nature of the disease there may be cases in which the conditions of the disease is more readily observable by toning down the level of red color or enhancing the level of blue color.

SUMMARY OF THE INVENTION

The object of the present invention is to provide an endoscopic apparatus which makes it readily possible to carry out a while balance according to the experiences and the preference of the operator.

A feature of the present invention resides in an endoscopic apparatus having a solid state image pickup elements to obtain an image data, which comprises: rewritable memory circuit for storing a correction data for eachimage data so as to cause the image data to be kept in a predetermined white balance; a counter being completed to the memory circuits for varying the contents in the memory circuits responsive to the incoming image data; and a feed back circuit for feeding back the varied correction data generated by the counter into the memory circuits.

These and other objects, features and advantages of the present invention will be more apparent from the following description of a preferred embodiment, taken in conjunction with the accompanying drawings.

DESCRIPTION OF THE PREFERRED EMBODIMENT

Figure 3:
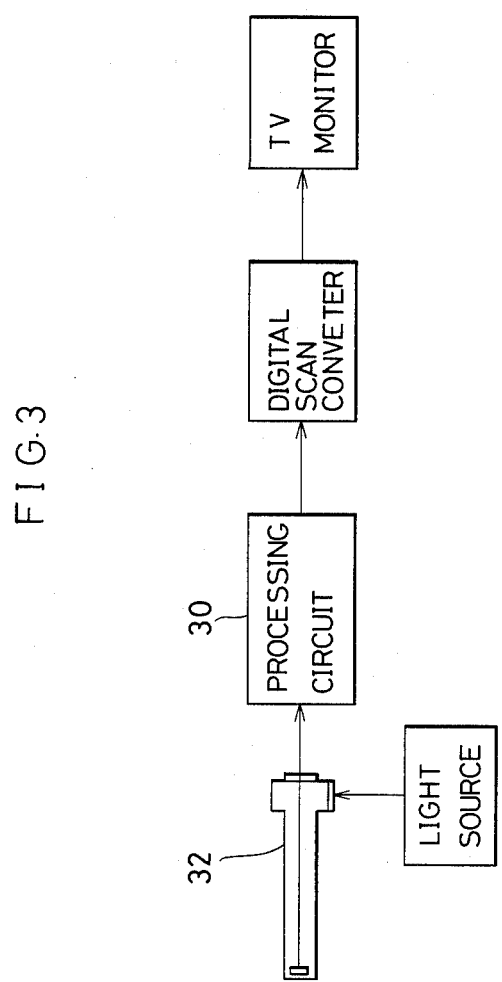
FIG. 3 is a block diagram for an endoscopic apparatus embodying the present invention.
Figure 4:
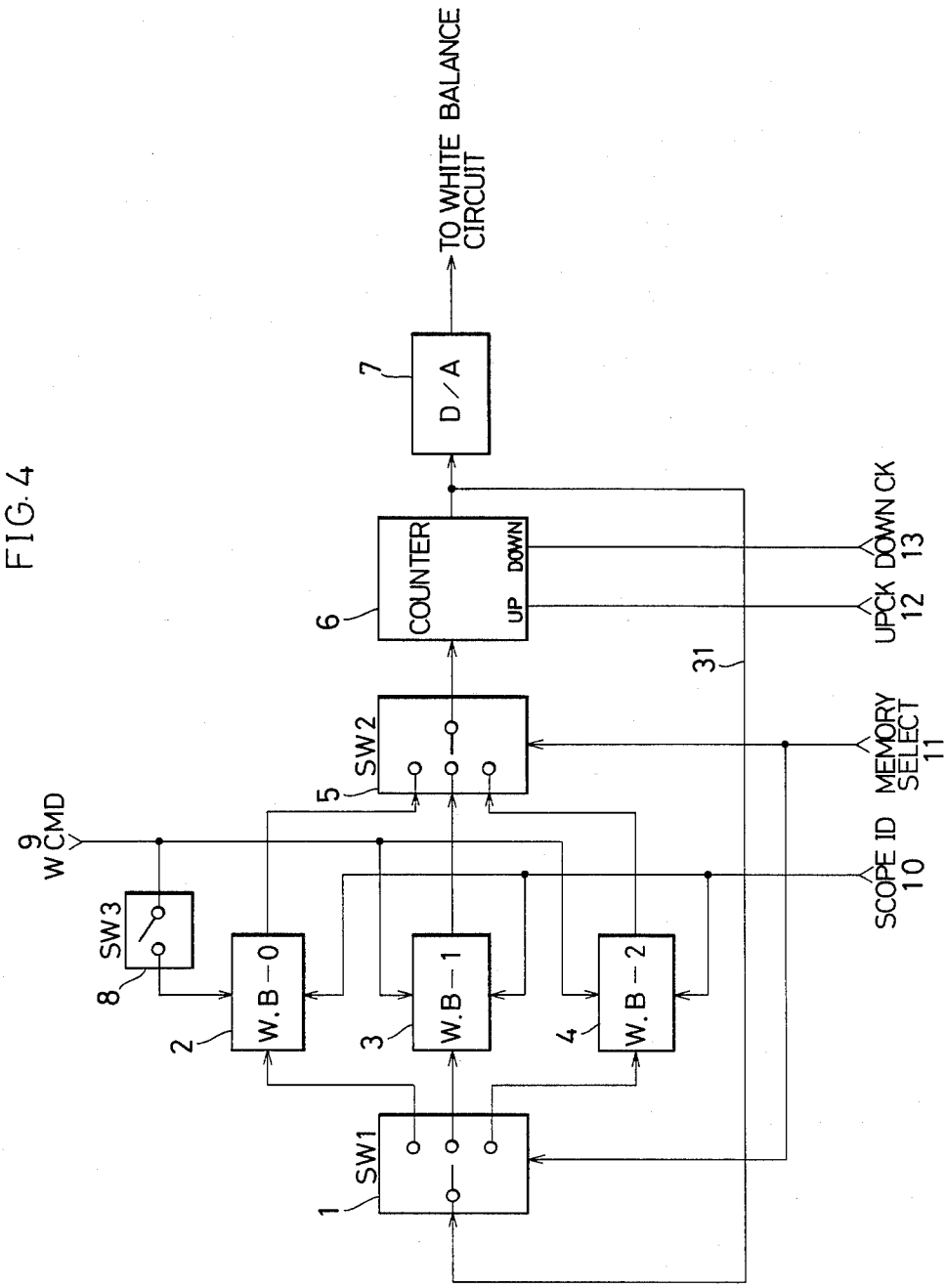
FIG. 4 is a block diagram of a color balance regulation circuit of the endoscopic apparatus shown in FIG. 3.

Referring to FIG. 3, there is shown an endoscopic apparatus embodying the present invention. In the process circuit 30 of the endoscopic apparatus, there is provided a white balance regulation circuit shown in FIG. 4. In accomplishing a white balance, with a certain color as a reference (in general, green is used as the reference), the chroma saturation of other two colors (red and blue) are varied. In FIG. 4, however, a case of one color alone is depicted for simplicity.

The white balance regulation circuit includes a rewritable memory circuit which is backed up by a battery cell or rewritable memory circuits 2, 3, and 4 (called memories hereinafter) which can transfer data from a memory circuit that is backed up by another battery cell, and a first and a second electronic switches or relays 1 and 5, and is arranged to be able to select either one out of the memories 2, 3, and 4 by a memory selection signal 11. For the ease of understanding, memory selection is described here by the use of a switch. Of course, a memory may also be selected by the control of a memory control terminal which is called a chip select that belongs generally to the memory. A counter 6 which may be present and shifted UP/DOWN, can be preset with a data of the selected memory by the second switch 5 by means of a load input that is not shown. A D/A conversion circuit 7 (referred to as D/A hereinafter) converts the output of the counter 6 to an analog signal and outputs it to the white balance circuit as mentioned earlier. Further, the output of the counter 6 is input through a feed-back circuit 31 and the first switch 1 to the data input terminal of the memory selected by the first switch 1. In the memories 2, 3, and 4, there are connected an ID signal 10 that is input from the scope 32 to the address terminal, and a write command signal 9 (referred to as WCMD hereinafter) that is generated by the panel control (see FIG. 5) to a predetermined terminal. Here, the ID signal that is input from the scope 32 is characteristic of each scope, and it can be determined by a combination of a plurality of pins, that are respectively preset, in the connector of the scope as shown in FIG. 6. A third switch 8 is to be used to store a correction data for predetermined white balance of the obtained image data in the memory 2 by the manufacturer, the seller, or the service man (these three will be referred to as the maker hereinafter). It is arranged in a position (for instance, on the printed substrate) which cannot be reached and operated by the user or is given a configuration which may be turned on only after a complicated panel control. Accordingly, the memory 2 in the present embodiment is treated as provided for holding the data that are set by the maker.

Figure 5:
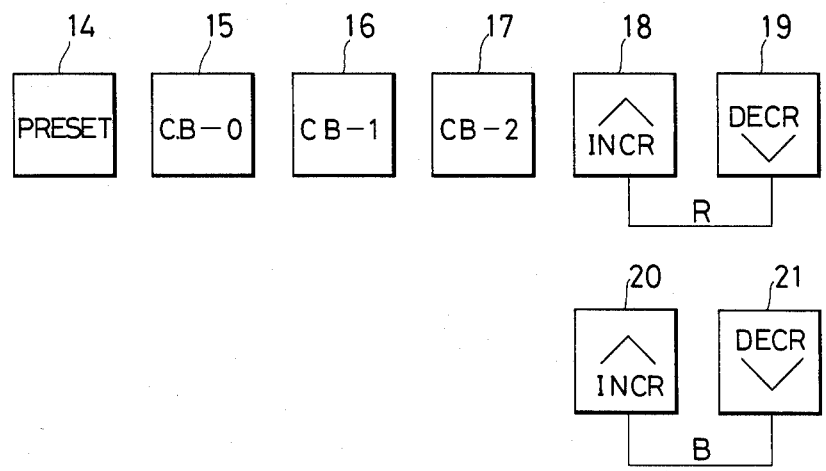
FIG. 5 is a diagram which illustrates the control switch panel in the endoscopic apparatus shown in FIG. 4.
Figure 6:
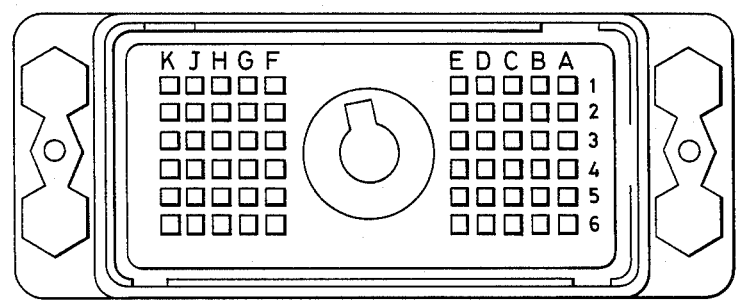
FIG. 6 is a diagram which illustrates the scope connector in the endoscopic apparatus embodying the present invention.

FIG. 5 shows control switches that are related to the above circuit, and the relation between the control of these switches and the operation of the circuit will be described in what follows.

Figure 1:
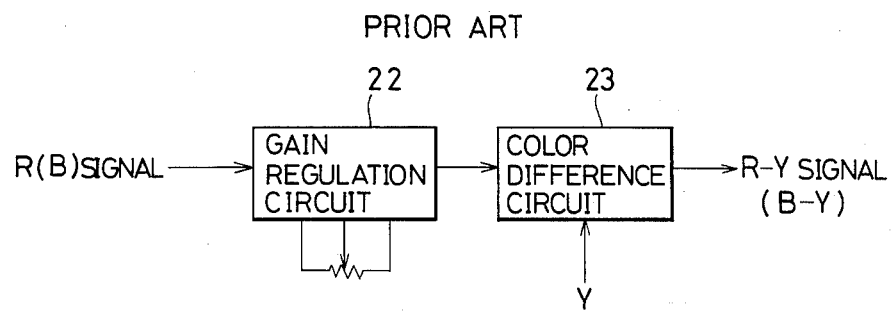
FIG. 1 is a block diagram for the prior-art white balance regulation circuit of manual type.
Figure 2:
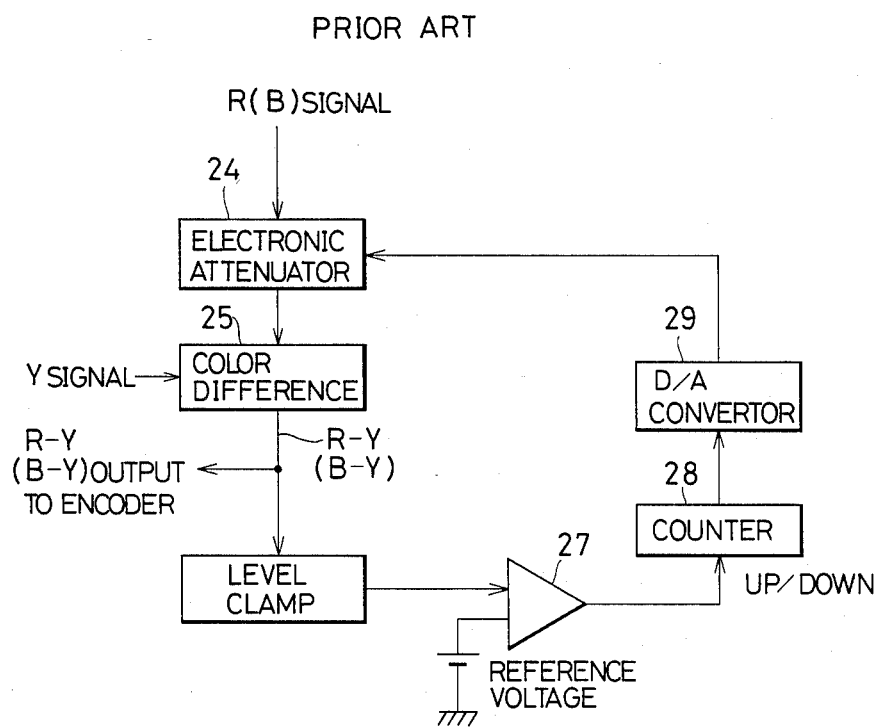
FIG. 2 is a block diagram for the prior-art white balance regulation circuit of automatic type.

A PRESET switch 14 is a switch for generating a WCMD 9 to rewrite the data in the memories 2, 3, and 4. Switches 15, 16, and 17 are for generating a memory selection signal 11 which is a control signal for each of the first switch 1 and the second switch 5. Corresponding to the operation of each of the switches 15, 16, and 17, either one of the memories 2, 3, and 4 is selected (for instance, the memory 3 is selected by pressing the switch 16). It should be noted that the switches 1, 5, 15, 16, and 17 correspond to an example of memory selection means. The content of the memory selected is preset in the counter 6, and is output to the output terminal as it is. This output data is converted to an analog signal in the D/A 7, and is input to the white balance circuit as mentioned before. However, if the user desires to change the color by examining the displayed color, it is possible to change the white balance by operating switches 18, 19 and 20, 21. For instance, assuming that the circuit in FIG. 1 is for R, by pressing the switch 18, there is generated an UP CK12 of FIG. 4, and the content of the D/A 7 is increased and red is enhanced. If the switch 19 is pressed, there is generated a DOWN CK13 of FIG. 4, and as a result red is subdued. Now, for blue (B), there is a similar circuit as shown in FIG. 4. Since all the signals, except for UP CK and DOWN CK of the counter, are used commonly so that UP CK and DOWN CK for B can be generated by pressing switches 20 and 21 in FIG. 5. It should be reminded that the counter 6 and the switches 18 through 21 form an example of hue changing means. Accordingly, the hues of both of red and blue can be varied, and as a result, it is possible to obtain an arbitrary hue. Namely, in the present embodiment, the switch 8 cannot be manipulated by the user as mentioned earlier so that the content of the memory 2 which stores the correction data corresponding to the white balance recommended in advance by the maker cannot be changed by the user. However, the displayed hue may be changed by the use of the switches 18 to 21. In this case, the optimum hue is different according to the region of the object or the experiences of the user. Thus, for example, it is troublesome to adjust the hue each time when the user is replaced so that in the present embodiment, the state in which the white balance was given is stored in the memories 3 and 4, and is arranged to be read out. Namely, the hue data that was adjusted by the user is held in the counter 6 as a digital signal. When the user presses the PRESET switch 14 after carrying out the color adjustment mentioned earlier, following the shift to the memory 3 by pressing the switch 16 by means of the first and the second switches 1 and 5, the data in the counter 6 is written in the memory 3 through the feedback circuit 31. Further, the address in the above operation is determined by the ID signal of the scope being used. Accordingly, when the same user inspects the identical portion using identical scope on a different day, for example, by the simple pressing of the switch 16 prior to the resumption of the inspection, the data which had been input previously is input automatically to the counter 6 from the memory 3, permitting to obtain inspection data with the hue which is identical to the previous hue without requiring any adjustment.

The apparatus of the present embodiment has the following operational effects.

(I) The memory 2 is made unable to be rewritten by the user so that it is possible to obtain all the time an image with fixed white balance. Accordingly, the user is able to compare the inspection data or the like with the image as the reference. Further, when it is thought that there exists some abnormality in the image obtained, it is possible to check quickly the presence or absence of the abnormality by taking an image of the predetermined chart by the use of the white balance in the memory 2.

(II) The memories 3 and 4 are made rewritable by the user so that it is possible to store the conditions set by the user to the optimum hue based on the experiences of the user and so forth. These conditions can readily be reset at the time of use in the subsequent occasions.

(III) The scope ID is used as the address at the time of rewriting and reading of the memory so that it is possible to respond to the setting of the color adjustment characteristic for the scope used, and the user can take out automatically the conditions that are suited to the scope connected, by the simple selection of the memory, making the operation of the apparatus easy.

In the foregoing, an embodiment of the present invention has been described. However, the present invention is not limited to the above embodiment, and various suitable modifications are possible without departing from the scope thereof.

Thus, for example, the number of memories need not be limited to three sets (those for R and B combined being counted as one set) but may appropriately be increased in response to the number of users, difference in color due to the region to be inspected, and so on.

As has been described in detail in the foregoing, according to the present invention, it is possible to store in the memories the conditions of white balance taken by the color adjustment alteration means, depending upon the experiences and the preference of the user (operator), and to obtain easily an optimum white balance by reading arbitrarily memory data depending upon the differences in the scope employed, region of the object, users, and so forth.

Various modifications will become possible for those skilled in the art after receiving the teachings of the present disclosure without departing from the scope thereof.

What is claimed is:

1. An endoscopic apparatus having a solid state image pickup elements to obtain an image data and a white balance circuit for adjusting a white balance of the obtained image data, comprising:
   means for memorizing a correction data for the obtained image data corresponding to a predetermined white balance;
   means for varying the correction data from said memory means and supplying the varied correction data to the white balance circuit; and
   means for feeding back the varied correction data to the memory means to thereby start the various correction data in the memory means.

2. The endoscopic apparatus as claimed in claim 1, wherein said correction data varying means comprises an UP/DOWN counter.

3. The endoscopic apparatus as claimed in claim 1, wherein the data varying means includes operator controlled input devices.

4. The endoscopic apparatus as claimed in claim 1, said memory means comprises a plurality of rewritable color regulation memory circuits and wherein the varied correction data is stored in the rewritable color regulation memory units.

5. The endoscopic apparatus as claimed in claim 4, further comprising:
   means for selecting one of the plurality of color regulation memory circuits.

6. The endoscopic apparatus as claimed in claim 5, wherein the selection means comprises a first and second electronic switch for selecting one of the plurality of color regulation memory circuits in accordance with a memory selection signal.

7. The endoscopic apparatus as claimed in claim 6, wherein the memory selection signal is generated by an operator controlled switch.

8. An endoscopic apparatus having a solid state scope unit to obtain image data and a white balance circuit for adjusting a white balance of the obtained image data, the endoscopic apparatus comprising:
   a. first and second memory units for storing data;
   b. a memory selection circuit, coupled to the first and second memory units, that selects data stored in at least one of the first and second memory units;
   c. a variation circuit, coupled to the memory selection circuit, that receives the data selected by the selection virucit, varies the data in response to input signals received from an operator controlled input device, and supplies the data to the white balance circuit;
   d. a feedback circuit, coupled to the variation circuit and the second memory, that supplies the data varied by the variation circuit to an address of the second memory unit designated by a scope unit ID signal which is supplied to the second memory unit.

9. The endoscope apparatus as claimed in claim 8, wherein said variation circuit comprises an UP/DOWN counter.

10. The endoscope apparatus as claimed in claim 9, wherein the data stored in the first memory unit is preset correction data corresponding to a predetermined white balance.

* * * * *